US010116166B2

(12) United States Patent
Blanc

(10) Patent No.: US 10,116,166 B2
(45) Date of Patent: Oct. 30, 2018

(54) AUTONOMOUS APPARATUS AND SYSTEM COMPRISING SUCH AN APPARATUS

(71) Applicant: PHILOX, Aix en Provence (FR)

(72) Inventor: Christophe Blanc, Lourmarin (FR)

(73) Assignee: Phlox, Aix en Provence (FR)

( * ) Notice: Subject to any disclaimer, the term of this patent is extended or adjusted under 35 U.S.C. 154(b) by 296 days.

(21) Appl. No.: 14/911,806

(22) PCT Filed: Aug. 4, 2014

(86) PCT No.: PCT/FR2014/000181
§ 371 (c)(1),
(2) Date: Feb. 12, 2016

(87) PCT Pub. No.: WO2015/022453
PCT Pub. Date: Feb. 19, 2015

(65) Prior Publication Data
US 2016/0197507 A1 Jul. 7, 2016

(30) Foreign Application Priority Data

Aug. 12, 2013 (FR) ..................... 13 01920

(51) Int. Cl.
H02J 50/10 (2016.01)
H02J 7/00 (2006.01)
H02J 7/02 (2016.01)
H05B 33/08 (2006.01)

(52) U.S. Cl.
CPC ............ H02J 50/10 (2016.02); H02J 7/0029 (2013.01); H02J 7/0068 (2013.01); H02J 7/025 (2013.01); H05B 33/083 (2013.01); H05B 33/0815 (2013.01); H05B 33/0842 (2013.01)

(58) Field of Classification Search
None
See application file for complete search history.

(56) References Cited

U.S. PATENT DOCUMENTS

| 8,487,591 | B1 | 7/2013 | Draper et al. | |
| 2001/0020802 | A1 | 9/2001 | Kitagawa et al. | |
| 2005/0146308 | A1* | 7/2005 | Quazi | B60L 11/02 322/28 |
| 2008/0290738 | A1* | 11/2008 | Greene | H02J 17/00 307/145 |
| 2009/0195214 | A1 | 8/2009 | Gehrke et al. | |
| 2010/0237840 | A1 | 9/2010 | Walter et al. | |
| 2012/0235508 | A1 | 9/2012 | Ichikawa | |
| 2013/0175937 | A1 | 7/2013 | Nakajo et al. | |

FOREIGN PATENT DOCUMENTS

| WO | 2006/038795 A2 | 4/2006 |
| WO | 2011/083258 A1 | 7/2011 |

* cited by examiner

Primary Examiner — Thienvu Tran
Assistant Examiner — David M Stables
(74) Attorney, Agent, or Firm — Ladas & Parry LLP

(57) ABSTRACT

The invention relates to apparatus (40) comprising:
an inductor;
a rectifier coupled to the inductor;
a voltage converter coupled to the rectifier;
a battery coupled to the voltage converter;
a load coupled to the voltage converter; and
a control unit coupled to the voltage converter and arranged to cause either the battery to be charged by the rectifier, or the load to be powered by the rectifier, or the load to be powered by the battery, as a function of the state of a switch for controlling powering of the load and as a function of the output voltage of the rectifier.

38 Claims, 2 Drawing Sheets

AUTONOMOUS APPARATUS AND SYSTEM COMPRISING SUCH AN APPARATUS

RELATED APPLICATION

This application is a national phase entry under 35 USC 371 of International Patent Application No PCT/FR2014/000181 filed on 4 Aug. 2014, which claims priority from French Application No. 1301920 filed on 12 Aug. 2013, the disclosures of which are incorporated in their entirety by reference herein.

TECHNICAL FIELD

The present invention relates to stand-alone apparatus powered by induction, and to a system including a device for powering such apparatus by induction.

The present invention applies particularly to stand-alone lighting apparatus using light-emitting diodes (LEDs), the apparatus being powered by induction, and it also relates to a lighting system including a device for powering such apparatus by induction.

STATE OF THE ART

International application WO 2011/083258 describes LED lighting apparatus powered by induction.

The lighting apparatus includes a light guide illuminated via two opposite edge faces by LEDs that are arranged respectively facing those two edge faces.

The LEDs are connected in parallel to the terminals of an inductor and they are arranged inside a housing having opaque walls defining an opening, and the light guide extends facing the opening.

The lighting apparatus is designed to be powered by a power supply module that has an inductor connected to the terminals of an alternating current (AC) generator.

The "front" face of the light guide is provided with diffusing elements, and a reflector is provided on—or touching—the "rear" face of the light guide.

The diffusing elements are constituted by elongate projections or depressions formed or arranged in or on the front face of the light guide, possibly being constituted by grooves formed using a laser beam, with mutual spacing between them varying along at least one axis.

The light emitted by the LEDs is subjected to multiple reflections within the light guide. The diffusing elements cause the light emitted by the LEDs and propagating in the light guide to be diffused towards each of the two opposite main faces of the light guide.

The lighting apparatus includes a capacitor and a rectifier connected in series with the inductor. Together with the inductor, the capacitor forms an oscillator circuit tuned to the frequency of the generator.

The rectifier is constituted by a diode bridge that powers parallel-connected groups of LEDs, each group of LEDs comprising a plurality of LEDs connected in series.

The lighting apparatus includes switches connected in series to the respective groups of LEDs, with the switches being opened and closed by a programmed microcontroller control unit so as to provide lighting with the desired intensity and/or color balance.

Pulse width modulation (PWM) type control modules may be incorporated in the control unit or interposed between the control unit and the switches, in order to control the powering of the LEDs.

The control unit is powered by a power supply module connected to the output of the rectifier, and it is connected to a signal and/or data transmitter by a bidirectional connection, and it is also connected to a movement sensor.

The transmitter enables the control unit to receive control data transmitted to the lighting apparatus by a remote control for the lighting apparatus.

The movement sensor may include one or more accelerometers secured to the housing of the lighting apparatus.

The movement sensor enables the control unit to detect movements of the lighting apparatus and to modify accordingly the signals delivered by the control unit to the switches, in particular for the purpose of varying the light flux emitted by the LEDs as a function of the signals delivered by the sensor.

The inductor of the lighting apparatus, acting as a secondary, and the inductor of the power supply module, acting as a primary, are formed by respective conductors in a spiral shape.

The power supply module (generator) includes a converter that produces AC at a frequency corresponding to the frequency of the resonant circuit of the lighting apparatus to be powered.

The converter includes an H-bridge having a central branch constituted by the primary inductor connected in series with a capacitor, and four transistor switches of a metal oxide on silicon field effect transistor (MOSFET) type controlled by a microcontroller control unit.

The microcontroller receives signals delivered by a converter connected to a current sensor that is sensitive to the current flowing through the inductor of the H-bridge.

The current sensor is used to detect variations in the current passing through the inductor of the bridge in order to deduce the presence—or the absence—of a secondary inductor in the magnetic field produced by the inductor of the generator, for the purpose of detecting the presence of a lighting apparatus to be powered by induction.

The microcontroller of the generator is also connected to a radio transmitter to send control data to the lighting apparatus.

Application US 2013/175937 describes another LED lighting apparatus that is powered by induction, and an induction power supply system for that apparatus.

SUMMARY OF THE INVENTION

An object of the invention is to provide an induction-powered stand-alone apparatus, in particular induction-powered stand-alone lighting apparatus, that is improved and/or that remedies, at least in part, the shortcomings or drawbacks of known stand-alone apparatuses.

An object of the invention is to propose stand-alone lighting apparatus, i.e. that is capable of powering the LEDs for a significant duration while the lighting apparatus is located at a distance from an induction generator.

An object of the invention is to propose induction-powered stand-alone apparatus that is simple, compact, and of high performance.

According to an aspect of the invention, there is provided apparatus comprising an inductor, a rectifier coupled to the inductor, and a load (indirectly) coupled to the rectifier, the apparatus further comprising a voltage converter coupled to the rectifier and a battery coupled to the voltage converter; the load is coupled to the voltage converter and the stand-alone apparatus further comprises a control unit coupled to the voltage converter and arranged to cause either the battery to be charged by the rectifier, or the load to be powered by the rectifier, or the load to be powered by the battery, as a function of the state of a member for controlling powering of the load and as a function of the output voltage of the rectifier.

In one embodiment, the load comprises—or is essentially constituted by—LEDs connected in series.

In other embodiments, the load may comprise a direct current (DC) motor, a computer or a tablet, a sensor, or a measurement instrument.

In an embodiment of the invention, there is provided lighting apparatus comprising an inductor, a rectifier connected (or otherwise coupled) to the inductor, an LED power supply circuit that is connected/coupled to the rectifier and that includes switches controlled by a programmable control unit; the control unit is programmed to adjust/control the power supply current to the LEDs from the inductor and the rectifier; the lighting apparatus further comprises a battery connected/coupled to the LED power supply circuit, and the control unit is also programmed, depending on the charge of the battery and on the presence of an induction generator, to adjust/control the current for charging the battery by the inductor and the rectifier, or for adjusting/controlling the battery current powering the LEDs.

In other words, and in another aspect of the invention, an apparatus is proposed that is powered by induction and that includes a battery, in which a converter circuit powered by a rectifier connected to the inductor is used and controlled either to charge the battery or to power the load from the rectifier, or to power the load from the battery.

The converter circuit converts a substantially DC input voltage into a substantially DC output voltage.

The voltage converter circuit may comprise a half-bridge circuit having two switches such as transistors, in particular MOSFET type transistors, with the switches being opened and closed by a switch driver circuit as a function of control signals delivered to the driver circuit by the control unit of the lighting apparatus.

In an embodiment, the voltage converter circuit is arranged and controlled to charge the battery by "lowering" the output voltage of the rectifier, i.e. at a charging voltage that is lower than the output voltage of the rectifier, generally using a charging current that is substantially constant.

Furthermore, the voltage converter circuit may be arranged and controlled to power the load, in particular the LEDs, from the battery by "raising" the output voltage from the battery, i.e. at a power supply voltage that is higher than the output voltage of the battery, in particular at a power supply current that is substantially constant, or at a power supply voltage that is substantially constant.

In another aspect of the invention, an induction-powered LED lighting apparatus is proposed that comprises an inductor, a rectifier coupled to the inductor, a voltage converter coupled to the rectifier, a battery coupled to the voltage converter, LEDs also coupled to the voltage converter, a programmable control unit coupled to the voltage converter and arranged to cause either the battery to be charged by the rectifier, or the LEDs to be powered by the rectifier, or the LEDs to be powered by the battery.

The apparatus preferably further comprises a priming circuit coupled to the rectifier and to the programmable control unit and including sufficient capacitance to power (temporarily) the control unit in the absence of a DC voltage being delivered by the rectifier or by the battery.

This makes it possible to prime operation of the apparatus using widely-spaced pulses of low mean power that are emitted by an induction power supply device having the apparatus placed facing it (e.g. on it).

In another aspect of the invention, there is provided a system for induction powering a stand-alone apparatus of the invention, the system comprising a device for powering the stand-alone apparatus by induction and comprising:
 a second DC converter;
 a (second) inductor coupled to the second DC converter; and
 a (second) control unit coupled to the second voltage converter and arranged to cause either the inductor to be powered by the second converter under a controlled voltage as a function of voltage data stored in a memory associated with the control unit, or pulses that are spaced apart in time to be delivered to the inductor by the second converter, as a function of the voltage measured across the terminals of the second inductor.

The invention makes it possible in particular to control in independent manner firstly the stand-alone apparatus and secondly the induction power supply device, without requiring any signals or data to be exchanged between the apparatus and the device, while ensuring that their respective functions are performed in stable manner.

The invention is advantageously applicable to lighting apparatus presenting characteristics described in international application WO 2011/083258, the content of which is incorporated herein (by reference).

Other aspects, characteristics, and advantages of the invention appear in the following description, which refers to the accompanying figures and shows preferred embodiments of the invention, without any limiting character.

DETAILED DESCRIPTION OF THE INVENTION

Figure 1:
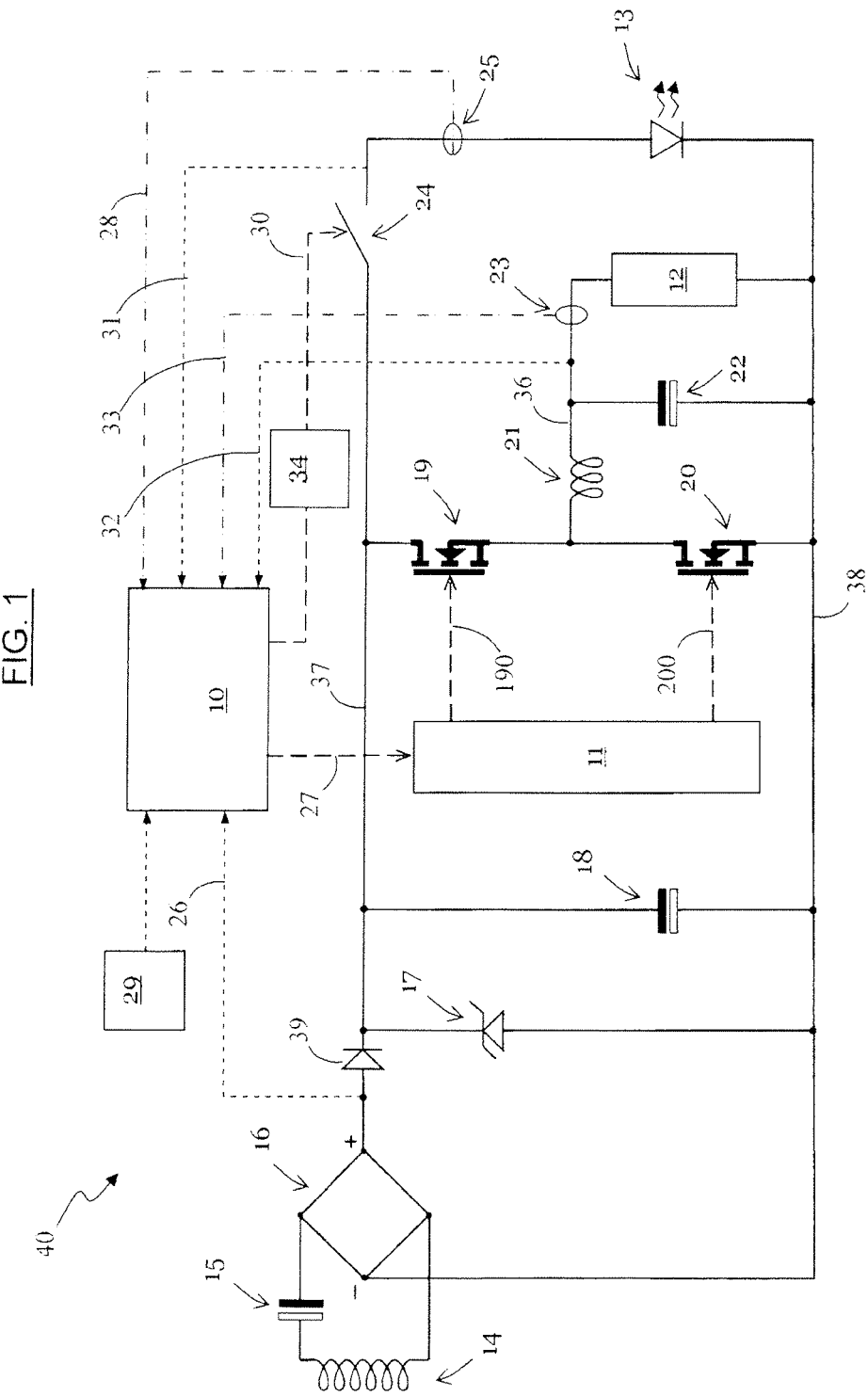
FIG. 1 is a diagram showing the main components—and their interconnections—of lighting apparatus in an embodiment.

With reference to FIG. 1, the lighting apparatus 40 includes at least one group of LEDs 13 connected in series, and an inductor 14 enabling the apparatus 40 to be powered by induction.

The apparatus 40 also has a battery 12 capable of storing electrical energy suitable for powering the LEDs during a significant length of time, which is preferably of the order of one or several hours.

A capacitor 15 connected in series with the inductor 14 serves to tune the inductor to the induction power supply frequency, which may be of the order of 10 kilohertz (kHz) to 20 kHz or 40 kHz, for example.

Figure 2:
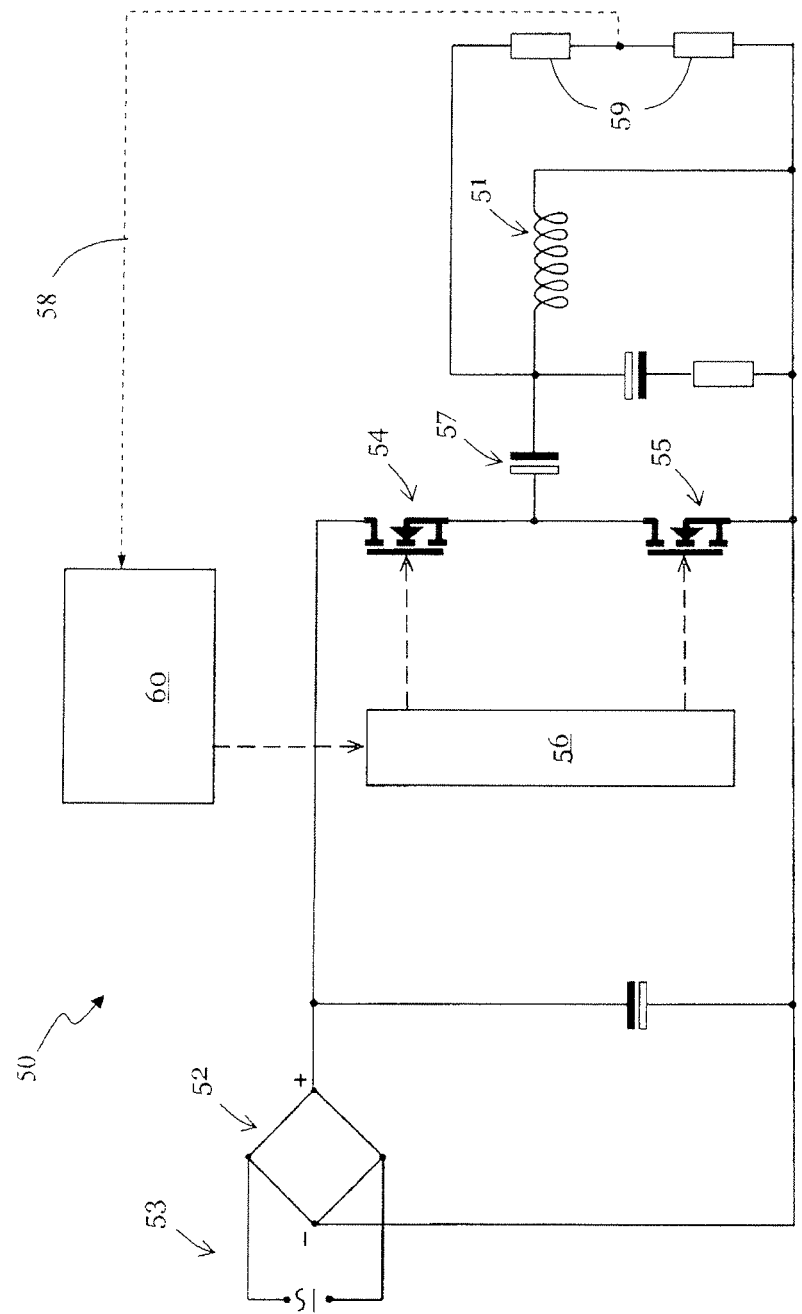
FIG. 2 is a diagram showing the main components—and their interconnections—of an induction power supply device for a lighting apparatus as shown in FIG. 1.

A diode rectifier bridge 16 is connected to the input circuit 14, 15 formed by the inductor 14 and the capacitor 15 for the purpose of rectifying the voltage delivered by this circuit when the inductor 14 is placed in the electromagnetic field produced by the inductor of an induction power supply device, such as that shown in FIG. 2.

The operation of the apparatus 40 is controlled by a control unit 10 having a microprocessor or a microcontroller and forming part of the apparatus, and it is controlled in particular as a function of signals delivered by a control member 29 connected to the unit 10.

The control member 29 acts as a power supply switch for the load 13 and it may be an accelerometer included in the apparatus so as to be sensitive to movements of the apparatus, such that the user of the apparatus can control its operation by imparting movements to the apparatus that are detected by the sensor 29.

Alternatively, the member 29 may include a sensor that is sensitive to an item making contact with the apparatus, in particular a pressure sensor that is sensitive to contact or pressure from a user's finger on the apparatus.

The output voltage from the rectifier bridge is measured by the control unit 10 by means of a connection 26 connecting the positive terminal of the rectifier to the unit 10.

A diode 39 connected to the positive terminal of the rectifier bridge serves to isolate the output voltage of the rectifier bridge from the voltage across the terminals of the battery 12 so as to enable the control unit 10 to detect when the apparatus 40 is being powered by induction.

A diode 17 connected between the diode 39 and the negative terminal of the rectifier 16 serves to protect the components of the apparatus that are situated downstream from the diode 17 against voltage peaks at the output from the rectifier.

A capacitor 18 connected in parallel with the diode 17 serves to store the electrical energy delivered by the circuits 14 to 16 and to transfer this energy to the control components of the apparatus, in particular the control unit 10, in order to power them during a stage of starting operation of the apparatus 40, when the battery 12 of the apparatus 40 is discharged and the induction power supply device is in standby mode, and is not transmitting the energy needed for powering the LEDs and/or for charging the battery.

The apparatus 40 includes a voltage converter circuit connected in parallel with the capacitor 18 and the diode 17, and serving to transform the substantially DC voltage at the output from the rectifier 16 into a substantially DC voltage of lower value for charging the battery 12.

The converter circuit comprises a half-bridge circuit having two MOSFET transistors 19 and 20 acting as switches and a circuit 11 connected to the transistors 19 and 20 via connections 190 and 200, and serving to control on/off switching of the transistors 19 and 20 as a function of control signals delivered to the circuit 11 by the control unit 10 when the control unit 10 seeks to charge the battery 12.

The voltage converter thus includes a branch connected to the output of the rectifier and including the two transistors 19 and 20 connected in series.

The voltage converter also has an inductor 21 and a capacitor 22 connected in series to the midpoint of the branch constituted by the transistors 19 and 20, between this midpoint and a equipotential bonding line 38 connected to the negative terminal of the rectifier.

It can be seen in FIG. 1 that the battery 12 is connected to the terminals of the capacitor 22, i.e. to the equipotential bonding line 38 and to the equipotential bonding line 36 connecting the capacitor 22 to the inductor 21.

It can also be seen that the LEDs 13 are connected in series with a switch 24 that is controlled by the unit 10 via a driver circuit 34 and a connection 30.

The switch 24 may likewise be a MOSFET type transistor.

The branch including the switch 24 and the LEDs is connected between the equipotential bonding line 37 connected to the positive terminal of the rectifier, and the equipotential bonding line 38.

In order to charge the battery 12 from the voltage delivered by the rectifier 16, the switch 24 is opened and the voltage converter constituted by the transistors 19 and 20 and the components 21 and 22 delivers a charging voltage to the terminals of the battery, which charging voltage is less than the voltage delivered by the rectifier.

In this mode of operation, the transistors 19 and 20 are controlled asynchronously by the circuit 11: only the transistor 19 is switched, while the transistor 20 is kept switched off.

Furthermore, in this mode, the control unit 10 monitors the charging voltage and current of the battery 12, respectively by means of a charging voltage measurement connection 32 and a connection 33 connected to a charging current sensor 23, which connections are connected to the equipotential bonding line connecting the battery 12 to the inductor 21.

Thus, charging can be started when the voltage measured by the connection 32 becomes less than a first determined voltage UC1, and charging can be stopped when the measured voltage reaches a second determined voltage UC2 of value greater than UC1.

During charging, the current measured by the sensor 23 may be maintained substantially constant, close to (or equal to) a first determined current IC1, by acting on how the transistor 19 is controlled by the circuit 11.

Alternatively, this current may advantageously be maintained substantially constant by acting on the voltage across the terminals of the inductor of the power supply device of the apparatus 40, as described below.

The values of the voltages UC1 and UC2, and of the current IC1 are adapted to the battery 12 that is used, which may for example be a lithium-ion electrochemical storage battery.

For the purpose of powering the LEDs "directly" by the current induced in the inductor 14 and rectified by the rectifier 16, the switch 24 is controlled by the unit 10 and the circuit 34 so as to deliver an appropriate power supply current to the LEDs.

While powering the LEDs, the control unit 10 can monitor the power supply voltage and current respectively via a power supply voltage measurement connection 31 and a connection 28 connected to a current sensor 25, which are connected in the branch containing the LEDs and the switch 24.

In this mode of operation, the power supply current for the LEDs as measured by the sensor 25 may advantageously be maintained substantially constant, close (or equal) to a second determined current IC2 by acting on the voltage across the terminals of the inductor of the power supply device of the apparatus 40, as described below.

In order to power the LEDs 13 from the voltage delivered by the battery 12, the switch 24 is closed and the voltage converter constituted by the transistors 19 and 20 and the components 21 and 22 delivers a power supply voltage to the terminals of the series-connected group of LEDs, which voltage is greater than the voltage delivered by the battery.

In this mode of operation, the transistors 19 and 20 are controlled synchronously by the circuit 11 to open and close in alternation (in phase opposition).

When the user requires the LEDs to be powered by acting on the member 29, the changeover from a mode of powering the LEDs by means of the battery 12 to a mode of powering them by means of the rectifier is controlled by the control unit 10 as a function of a measurement of the output voltage from the rectifier 16, indicating whether the apparatus 40 is arranged facing a device suitable for powering it by induction.

When this condition is satisfied, the unit 10 causes the LEDs to be powered by the rectifier and the switch 24 operated by the driver circuit 34.

If this condition is not satisfied, the unit 10 causes the LEDs to be powered by the battery 12 and the converter 19 to 22, so long as the voltage of the battery is not less than the determined voltage UC1. During this stage, the unit 10 can measure the voltage across the terminals of the battery and can control the circuit 11 so as to increase the discharge current from the battery and compensate for the drop in the voltage.

When the battery voltage becomes less than the voltage UC1, the unit 10 causes the battery to stop powering the LEDs.

With reference to FIG. 2, the power supply device 50 includes a primary inductor 51 for creating a magnetic field tuned to the secondary inductor (reference 14, FIG. 1) of the lighting apparatus for powering by induction.

The device 50 includes a rectifier bridge 52 for rectifying an AC voltage delivered by a source 53, and a voltage converter circuit 54, 55, 57 similar to that described above.

This converter circuit has a branch with two transistors 54, 55 connected in series across the terminals of the rectifier 52.

The primary inductor 51 is connected to the midpoint of the half-bridge 54, 55 via a capacitor 57, and to the negative terminal of the rectifier 52.

The operation of the transistors 54 and 55 is driven by a circuit 66 that is controlled by a microcontroller control unit 60.

The control unit 60 measures the voltage across the terminals of the primary inductor 51 by means of a connection 58 connecting the unit 60 to the midpoint of a divider bridge having resistors 59.

The measurement of this voltage enables the unit 60 to adapt the way the transistors 54 and 55 are controlled as a function of the "needs" of the lighting apparatus 40 having its secondary inductor 14 placed in the field of the primary inductor 51, in a manner that is more accurate and more reliable than by measuring the current flowing in the primary inductor 51.

Specifically, the measurement of this voltage corresponds to an image of the power being absorbed by the apparatus 40 having its inductor 14 placed in the field generated by the primary inductor 51.

For example, while the battery 12 of the apparatus 40 is charging, the voltage across the terminals of the battery increases progressively during charging, thereby increasing the power absorbed by the apparatus 40.

This results in an increase in the power passing through the primary inductor 51 and the voltage across its terminals. This voltage—and the power delivered to the primary inductor—can then be regulated by the unit 60 as a function of data stored in a memory associated with the unit 60, which data is determined from the charging characteristics of the battery 12 so as to keep the charging current of the battery substantially constant.

Thus, the charging of the battery 12 is advantageously managed exclusively by the induction power supply device 50, which is arranged to deliver a substantially constant battery charging current to the apparatus 40, and thus to deliver power that increases with increasing battery voltage.

When the inductor of the lighting apparatus is placed facing and close to the primary inductor 51, and when the control unit of the apparatus causes the battery of the apparatus to be charged or the LEDs to be powered, and subsequently the charging of the battery (or the powering of the LEDs) is stopped or indeed the apparatus is moved away from the device 50, then the voltage across the terminals of the primary inductor 51 increases.

When this increase is detected by the control unit 60, the control unit stops the voltage converter powering the primary inductor, so as to enter a "standby" mode in which the unit 10 and the circuit 56 cause pulses to be produced that are spaced apart in time with a small duty ratio, e.g. by producing one pulse with a duration of a few milliseconds once every second.

When the inductor of a lighting apparatus 40 with a battery that is discharged (or having LEDs that need to be powered) is once more facing and close to the primary inductor 51, these pulses are sufficient to charge the priming capacitor 18 included in the apparatus 40.

Once the energy stored in the priming capacitor is sufficient to power the unit 10, it causes the battery 12 to be charged by the circuit 11, thereby raising the voltage in the primary inductor 51, with this raise being detected by the unit 60, which in turn controls starting of powering via induction.

In the absence of any need to power the battery charger 12 or the LEDs 13, the voltage across the terminals of the primary inductor exceeds a determined value, with this being detected by the unit 60, which then stops powering the primary inductor in order to return to standby mode.

Although the above detailed description relates to the invention being applied to a lighting apparatus, it should be understood that the invention may advantageously be applied to any stand-alone apparatus, having a load that may be a motor or a sensor for example.

The invention results in induction-powered stand-alone apparatus that is simple in structure and stable in operation.

The invention also results in a system for powering stand-alone apparatus by induction, in particular stand-alone lighting apparatus, that does not require data to be transferred in operation between the apparatus and the device powering it.

As described above and according to an aspect of the invention, the power supply to the battery and the LEDs of the lighting apparatus is managed exclusively by the induction power supply device 50. The circuits of the apparatus 40 take action only for powering the LEDs from the battery 14 and for making the various current and voltage measurements in order to direct the induced current to the LEDs or to the battery, depending on the actions of the user on the control member 29 (in particular an accelerometer or a pressure sensor).

The invention claimed is:

1. Apparatus (40) comprising an inductor (14), a rectifier (16) coupled to the inductor, a load (13) coupled to the rectifier, and a control member (29) for controlling power supply to the load (13), the apparatus being characterized in that it further comprises:

a DC voltage converter (19 to 22) coupled to the rectifier (16);

a battery (12) coupled to the voltage converter; and measurement means (26) for measuring the output voltage of the rectifier (16);

a priming circuit (18) coupled to the rectifier and to the programmable control unit and presenting sufficient capacitance to be capable of powering the control unit temporarily in the absence of a DC voltage being delivered to the rectifier or by the battery;

the load (13) being coupled to the voltage converter, and the apparatus (40) further comprising a control unit (10) coupled to the voltage converter, connected to the control member (29) and to the voltage measurement means (26), and arranged to cause either the battery to be charged by the rectifier, or the load (13) to be powered by the rectifier, or the load (13) to be powered by the battery, as a function of the state of the control member (29) and of the output voltage of the rectifier (16).

2. Apparatus according to claim 1, wherein the voltage converter comprises a half-bridge circuit comprising two switches (19, 20) that are opened and closed under the control of a switch driver circuit (11) as a function of control signals delivered to the driver circuit (11) by the control unit (10).

3. Apparatus according to claim 1, wherein the control member (29) acting as a switch comprises a sensor that is sensitive to an item making contact with the apparatus, in particular a sensor that is sensitive to a user's finger contacting or pressing against the apparatus, e.g. a pressure sensor.

4. Apparatus according to claim 1, wherein the voltage converter is arranged and controlled so as to charge the battery at a voltage lower than the output voltage of the rectifier, and to power the load (13) from the battery at a voltage that is higher than the output voltage of the battery, in particular at a voltage that is substantially constant or at a current that is substantially constant.

5. Apparatus according to claim 1 including means (10, 32) for measuring the battery charge voltage.

6. Apparatus according to claim 1, including means (10, 25, 28) for measuring the current powering the load (13).

7. Apparatus according to claim 1, including a circuit (17) providing protection against excess voltages, which circuit is connected/coupled to the output of the rectifier.

8. Apparatus according to claim 1, wherein the voltage converter includes a branch having two transistors (19, 20) connected in series across the output of the rectifier, with the midpoint of the branch being connected to the battery by an inductor (21) and a capacitor (22).

9. Apparatus according to claim 1, wherein the load (13) is connected to the rectifier and to the voltage converter via a switch (24) controlled by the control unit (10).

10. Apparatus according to claim 1, wherein the load (13) comprises—or is essentially constituted by—LEDs connected in series.

11. Apparatus according to claim 1, wherein the load (13) comprises a DC motor, a tablet or a computer, a sensor, or a measurement instrument.

12. An induction power supply system comprising an apparatus (40) and an induction power supply device (50) for powering the apparatus (40), wherein the apparatus comprises:
a first inductor (14),
a rectifier (16) coupled to the inductor,
a load (13) coupled to the rectifier,
a control member (29) for controlling power supply to the load (13),
a first DC voltage converter (19 to 22) coupled to the rectifier (16),
a battery (12) coupled to the first DC voltage converter; and
measurement means (26) for measuring the output voltage of the rectifier (16);
the load (13) being coupled to the voltage converter, and the apparatus (40) further comprising:
a first control unit (10) coupled to the voltage converter, connected to the control member (29) and to the voltage measurement means (26), and arranged to cause either the battery to be charged by the rectifier, or the load (13) to be powered by the rectifier, or the load (13) to be powered by the battery, as a function of the state of the control member (29) and of the output voltage of the rectifier (16); and
a priming circuit (18) coupled to the rectifier and to the first control unit and presenting sufficient capacitance to be capable of powering the first control unit temporarily in the absence of a DC voltage being delivered by the rectifier or by the battery,
and wherein the induction power supply device comprises:
a second DC voltage converter (54, 55, 57);
a second inductor (51) coupled to the second voltage converter;
a measurement circuit (59) for measuring voltage across the terminals of the second inductor (51); and
a second control unit (60) coupled to the second voltage converter, connected to the measurement circuit (59), and arranged to control either powering of the second inductor (51) by the second converter under a control voltage as a function of voltage data stored in a memory associated with the second control unit (60), or the delivery of pulses that are spaced apart in time to the second inductor (51) by the second converter, as a function of voltage measurements delivered by the measurement circuit (59).

13. An induction power supply system according to claim 12, wherein the first voltage converter comprises a half-bridge circuit comprising two switches (19, 20) that are opened and closed under the control of a switch driver circuit (11) as a function of control signals delivered to the driver circuit (11) by the first control unit (10).

14. An induction power supply system according to claim 12, wherein the control member (29) acting as a switch comprises a sensor that is sensitive to an item making contact with the apparatus, in particular a sensor that is sensitive to a user's finger contacting or pressing against the apparatus, e.g. a pressure sensor.

15. An induction power supply system according to claim 12, wherein the first voltage converter is arranged and controlled so as to charge the battery at a voltage lower than the output voltage of the rectifier, and to power the load (13) from the battery at a voltage that is higher than the output voltage of the battery, in particular at a voltage that is substantially constant or at a current that is substantially constant.

16. An induction power supply system according to claim 12, wherein the first voltage converter includes a branch having two transistors (19, 20) connected in series across the output of the rectifier, with the midpoint of the branch being connected to the battery by an inductor (21) and a capacitor (22).

17. An induction power supply system according to claim 12, wherein the load (13) is connected to the rectifier and to the voltage converter via a switch (24) controlled by the first control unit (10).

18. An induction power supply system according to claim 12, wherein the load (13) comprises—or is essentially constituted by—LEDs connected in series.

19. An induction power supply system according to claim 12, wherein the load (13) comprises a DC motor, a tablet or a computer, a sensor, or a measurement instrument.

20. Apparatus (40) comprising an inductor (14), a rectifier (16) coupled to the inductor, a load (13) coupled to the rectifier, and a control member (29) for controlling power supply to the load (13), the apparatus further comprising:
a DC voltage converter (19 to 22) coupled to the rectifier (16);
a battery (12) coupled to the voltage converter; and measurement means (26) for measuring the output voltage of the rectifier (16);

the load (13) being coupled to the voltage converter, and the apparatus (40) further comprising a control unit (10) coupled to the voltage converter, connected to the control member (29) and to the voltage measurement means (26), and arranged to cause either the battery to be charged by the rectifier, or the load (13) to be powered by the rectifier, or the load (13) to be powered by the battery, as a function of the state of the control member (29) and of the output voltage of the rectifier (16), wherein the voltage converter includes a branch having two transistors (19, 20) connected in series across the output of the rectifier, with the midpoint of the branch being connected to the battery by an inductor (21) and a capacitor (22).

21. Apparatus according to claim 20, wherein the voltage converter comprises a half-bridge circuit comprising two switches (19, 20) that are opened and closed under the control of a switch driver circuit (11) as a function of control signals delivered to the driver circuit (11) by the control unit (10).

22. Apparatus according to claim 20, wherein the control member (29) acting as a switch comprises a sensor that is sensitive to an item making contact with the apparatus, in particular a sensor that is sensitive to a user's finger contacting or pressing against the apparatus, e.g. a pressure sensor.

23. Apparatus according to claim 20, wherein the voltage converter is arranged and controlled so as to charge the battery at a voltage lower than the output voltage of the rectifier, and to power the load (13) from the battery at a voltage that is higher than the output voltage of the battery, in particular at a voltage that is substantially constant or at a current that is substantially constant.

24. Apparatus according to claim 20, including a priming circuit (18) coupled to the rectifier and to the control unit and presenting sufficient capacitance to be capable of powering the control unit temporarily in the absence of a DC voltage being delivered by the rectifier or by the battery.

25. Apparatus according to claim 20, including means (10, 32) for measuring the battery charge voltage.

26. Apparatus according to claim 20, including means (10, 25, 28) for measuring the current powering the load (13).

27. Apparatus according to claim 20, including a circuit (17) providing protection against excess voltages, which circuit is connected/coupled to the output of the rectifier.

28. Apparatus according to claim 20, wherein the load (13) is connected to the rectifier and to the voltage converter via a switch (24) controlled by the control unit (10).

29. Apparatus according to claim 20, wherein the load (13) comprises—or is essentially constituted by—LEDs connected in series.

30. Apparatus according to claim 20, wherein the load (13) comprises a DC motor, a tablet or a computer, a sensor, or a measurement instrument.

31. An induction power supply system comprising an apparatus (40) and an induction power supply device (50) for powering the apparatus (40), wherein the apparatus comprises:

a first inductor (14),
a rectifier (16) coupled to the inductor,
a load (13) coupled to the rectifier,
a control member (29) for controlling power supply to the load (13), a first DC voltage converter (19 to 22) coupled to the rectifier (16),
a battery (12) coupled to the first DC voltage converter; and
measurement means (26) for measuring the output voltage of the rectifier (16);

the load (13) being coupled to the voltage converter, and the apparatus (40) further comprising a first control unit (10) coupled to the voltage converter, connected to the control member (29) and to the voltage measurement means (26), and arranged to cause either the battery to be charged by the rectifier, or the load (13) to be powered by the rectifier, or the load (13) to be powered by the battery, as a function of the state of the control member (29) and of the output voltage of the rectifier (16);

wherein the voltage converter includes a branch having two transistors (19, 20) connected in series across the output of the rectifier, with the midpoint of the branch being connected to the battery by an inductor (21) and a capacitor (22), and wherein the induction power supply device comprises:
a second DC voltage converter (54, 55, 57);
a second inductor (51) coupled to the second voltage converter;
a measurement circuit (59) for measuring voltage across the terminals of the second inductor (51); and
a second control unit (60) coupled to the second voltage converter, connected to the measurement circuit (59), and arranged to control either powering of the second inductor (51) by the second converter under a control voltage as a function of voltage data stored in a memory associated with the second control unit (60), or the delivery of pulses that are spaced apart in time to the second inductor (51) by the second converter, as a function of voltage measurements delivered by the measurement circuit (59).

32. An induction power supply system according to claim 31, wherein the first voltage converter comprises a half-bridge circuit comprising two switches (19, 20) that are opened and closed under the control of a switch driver circuit (11) as a function of control signals delivered to the driver circuit (11) by the first control unit (10).

33. An induction power supply system according to claim 31, wherein the control member (29) acting as a switch comprises a sensor that is sensitive to an item making contact with the apparatus, in particular a sensor that is sensitive to a user's finger contacting or pressing against the apparatus, e.g. a pressure sensor.

34. An induction power supply system according to claim 31, wherein the first voltage converter is arranged and controlled so as to charge the battery at a voltage lower than the Output voltage of the rectifier, and to power the load (13) from the battery at a voltage that is higher than the output voltage of the battery, in particular at a voltage that is substantially constant or at a current that is substantially constant.

35. An induction power supply system according to claim 31, including a priming circuit (18) coupled to the rectifier and to the first control unit and presenting sufficient capacitance to be capable of powering the first control unit temporarily in the absence of a DC voltage being delivered by the rectifier or by the battery.

36. An induction power supply system according to claim 31, wherein the load (13) is connected to the rectifier and to the voltage converter via a switch (24) controlled by the first control unit (10).

37. An induction power supply system according to claim 31, wherein the load (13) comprises—or is essentially constituted by—LEDs connected in series.

38. An induction power supply system according to claim 31, wherein the load (13) comprises a DC motor, a tablet or a computer, a sensor, or a measurement instrument.

* * * * *